(12) United States Patent
Yang

(10) Patent No.: US 8,861,096 B2
(45) Date of Patent: Oct. 14, 2014

(54) IMAGING LENS

(71) Applicant: Himax Technologies Limited, Tainan (TW)

(72) Inventor: Chuan-Hui Yang, Tainan (TW)

(73) Assignee: Himax Technologies Limited, Tainan (TW)

( * ) Notice: Subject to any disclaimer, the term of this patent is extended or adjusted under 35 U.S.C. 154(b) by 64 days.

(21) Appl. No.: 13/754,235

(22) Filed: Jan. 30, 2013

(65) Prior Publication Data

US 2014/0071544 A1 Mar. 13, 2014

Related U.S. Application Data

(60) Provisional application No. 61/699,309, filed on Sep. 11, 2012.

(51) Int. Cl.
*G02B 3/02* (2006.01)
*G02B 13/00* (2006.01)

(52) U.S. Cl.
CPC .................................... *G02B 13/004* (2013.01)
USPC ........................................................ 359/715

(58) Field of Classification Search
USPC ........................................................ 359/715
See application file for complete search history.

(56) References Cited

U.S. PATENT DOCUMENTS

| 2010/0166413 | A1 | 7/2010 | Hirao et al. |
| 2011/0080658 | A1 | 4/2011 | Deng et al. |
| 2013/0107376 | A1* | 5/2013 | Tsai et al. ..................... 359/714 |

FOREIGN PATENT DOCUMENTS

| CN | 101313239 | 11/2008 |
| JP | 2008-233884 | 10/2008 |
| TW | 201113552 | 4/2011 |

OTHER PUBLICATIONS

"Office Action of Taiwan Counterpart Application", issued on Jun. 26, 2014, pp. 1-5.

* cited by examiner

*Primary Examiner* — James Jones
(74) *Attorney, Agent, or Firm* — J.C. Patents

(57) ABSTRACT

An imaging lens including a first lens group and a second lens group is provided. The first lens group is disposed between an object side and an image side. A surface closest to the object side in the first lens group is a first aspheric surface. A surface closest to the image side in the first lens group is a second aspheric surface. The second lens group is disposed between the first lens group and the image side. A surface closest to the first lens group in the second lens group is a third aspheric surface. A surface closest to the image side in the second lens group is a fourth aspheric surface. The imaging lens satisfies: $-8 < f2/f < -4$, where f is an effective focal length (EFL) of the imaging lens, and f2 is an EFL of the second lens group.

18 Claims, 6 Drawing Sheets

IMAGING LENS

CROSS-REFERENCE TO RELATED APPLICATION

This application claims the priority benefits of U.S. provisional application Ser. No. 61/699,309, filed on Sep. 11, 2012. The entirety of the above-mentioned patent applications is hereby incorporated by reference herein and made a part of this specification.

BACKGROUND OF THE INVENTION

1. Field of the Invention

The invention relates to a lens, and more particularly to an imaging lens.

2. Description of Related Art

Along with progress of technology, various portable electronic products such as mobile phones, personal digital assistants (PDAs), notebook computers, tablet computers, etc. are generally equipped with a micro camera lens to facilitate users capturing important moments in their daily lives. As the need of portable electronic equipped with micro camera springing up, the relentless pursuit of better performance as well as the inexpensive price has become a focus of developing micro camera lens.

Generally speaking, a micro-lens module for photographing is required to provide a high imaging quality and a miniaturized size to satisfy the market demand. For the micro-camera in the market currently, wafer level lens manufacturing method has been developed to satisfy the massive need of micro-lens modules among the world. For examples, numerous tiny drops of molten lens materials are put on an array of a wafer and the micro-lens can be then produced by methods such as molding or embossing the tiny drops of molten lens materials respectively according to their required purposes. The drops of molten lens materials are then being solidified to keep the required shapes, and finally the wafer can be cut into numerous elements with micro lens attached on. The micro lens fabricated on the wafer (or so called wafer level lens) can be mounted onto the final productions (such as electronic products mentioned above) through the assembly process such as surface mount technology process.

However, since the size of a wafer is limited, the size of each micro-lens critically determines the numbers of the micro lens products. Namely, the smaller the size of each micro lens can be achieved, the larger numbers of micro lens products can be produced. Therefore, a design for a micro-lens of a smaller size without compromising on image performance is still looking for further development. Besides, the lens providing good imaging performance for ordinary applications is also requiring for further progresses.

SUMMARY OF THE INVENTION

The invention is directed to an imaging lens capable of providing high performance image quality.

An embodiment of the invention provides an imaging lens comprising a first lens group and a second lens group. The first lens group is disposed between an object side and an image side, wherein a surface closest to the object side in the first lens group is a first aspheric surface, and a surface closest to the image side in the first lens group is a second aspheric surface. The first lens group includes a first transparent plate positioned between the first aspheric surface and the second aspheric surface. The second lens group is disposed between the first lens group and the image side, wherein a surface closest to the first lens group in the second lens group is a third aspheric surface, and a surface closest to the image side in the second lens group is a fourth aspheric surface. The second lens group includes a second transparent plate positioned between the third aspheric surface and the fourth aspheric surface. The imaging lens satisfies: $-8<f2/f<-4$, where f is an effective focal length (EFL) of the imaging lens, and f2 is an EFL of the second lens group.

Based on the above description, according to the exemplary embodiments of the invention, since the imaging lens has four aspheric surfaces and satisfies: $-8<f2/f<-4$, the imaging lens has good imaging quality.

In order to make the aforementioned and other features and advantages of the invention more comprehensible, embodiments accompanying figures are described in detail below.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1A:
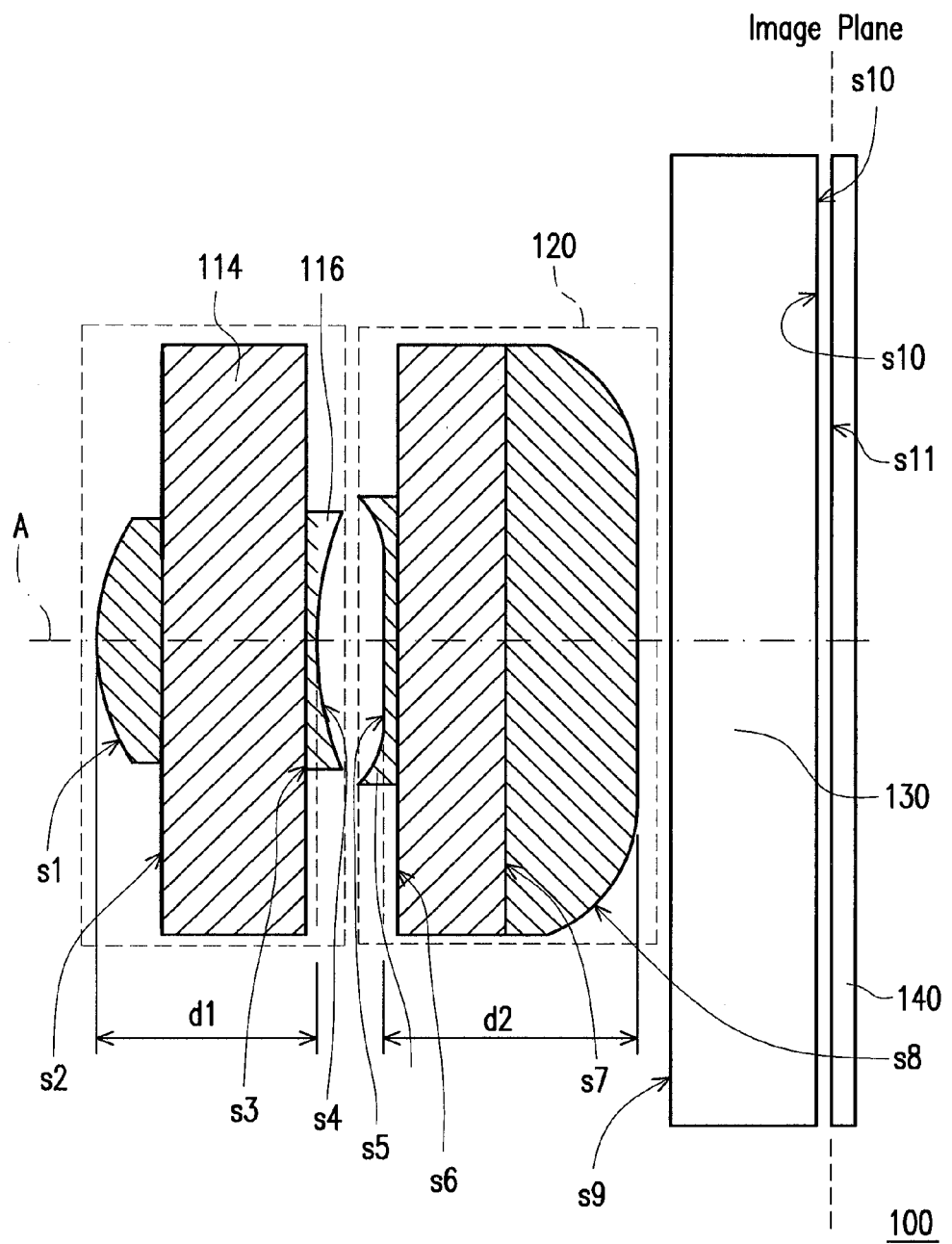
FIG. 1A illustrates a schematic structural diagram of an imaging lens according to an embodiment of the invention.

FIG. 1A illustrates a schematic structural diagram of an imaging lens according to an embodiment of the invention. Referring to FIG. 1A, in the present embodiment, the imaging lens 100 includes a first lens group 110 and a second lens group 120 disposed along optical axis A. The first lens group 100 is disposed between an image side (namely, in the present embodiment, the side on the image plane S10) and an object side (namely, in the present embodiment, the opposite side to the image side), wherein a surface closest to the object side in the first lens group 110 is a first aspheric surface S1, and a surface closest to the image side in the first lens group 110 is a second aspheric surface S4. The first lens group 110 further includes a first transparent plate 114 positioned between the first aspheric surface S1 and the second aspheric surface S4. The second lens group 120 is disposed between the first lens group 110 and the image side, wherein a surface closest to the first lens group 100 in the second lens group 120 is a third aspheric surface S5, and a surface closest to the image side in the second lens group 120 is a fourth aspheric surface S8. The second lens group 120 further comprises a second transparent plate 124 positioned between the third aspheric surface S5 and the fourth aspheric surface S8. The imaging lens satisfies: $-8<f2/f<-4$, where f is an effective focal length (EFL) of the imaging lens 100, and f2 is an EFL of the second lens group 120.

Furthermore, in the present embodiment, d1 is a distance between the first aspheric surface S1 and the second aspheric surface S4 along an optical axis A of the imaging lens 100, d2 is a distance between the third aspheric surface S5 and the fourth aspheric surface S8 along an optical axis A of the imaging lens 100, and the imaging lens 100 further satisfies following conditions: 0.8<d1/d2<1. In the present embodiment, an image processing device such as a charge coupled device (CCD), or a complementary metal-oxide-semiconductor (CMOS) sensor, etc. may be disposed on the image plane 10 for image sensing. By the arrangement mentioned above in this embodiment, the imaging lens 100 may provides good image quality yet miniaturized size. Furthermore, the number of imaging lens 100 produced per wafer may thus increase by the miniaturized size of the imaging lens 100, while the cost may decrease as the yield of the imaging lens 100 grows.

In detail, in the present embodiment, r1 is a paraxial radius of curvature of the first aspheric surface S1, r2 is a paraxial radius of curvature of the second aspheric surface S4, r3 is a paraxial radius of curvature of the third aspheric surface S5, r4 is a paraxial radius of curvature of the fourth aspheric surface S8, and the imaging lens 100 satisfies following conditions: r1>0, r2>0, r3<0, and r4>0. It should be noticed that the plus or minus sign of the radius of curvature r1, r2, r3 and r4 represents the shape of the curvature. In the present embodiment, r1 is a paraxial radius of curvature of the first aspheric surface s1, r2 is a paraxial radius of curvature of the second aspheric surface s4, r3 is a paraxial radius of curvature of the third aspheric surface s5, and r4 is a paraxial radius of curvature of the fourth aspheric surface s8, and wherein a positive paraxial radius of curvature means an aspheric surface having the positive paraxial radius of curvature curves towards the object side on the optical axis of the imaging lens, and a negative paraxial radius of curvature means an aspheric surface having the negative paraxial radius of curvature curves towards the image side on the optical axis of the imaging lens. Furthermore, the imaging lens satisfies: 0.3<r1/r2<0.6.

Referring to FIG. 1A again, the first lens group 110 and the second lens group 120 respectively include a plurality of lenses. Specifically, the first lens group 110 disposed between the object side and the image side includes a first lens 112, a first transparent plate 114 and a second lens 116. The first lens 112, the first transparent plate 114 and the second lens 116 are arranged in sequence from the object side to the image side. Furthermore, the first lens 112 is a lens closest to the object side in the first lens group 110, the first aspheric surface S1 is a surface of the first lens 112 facing to the object side, the second lens 116 is a lens closest to the second lens group 120 in the first lens group 110, and the second aspheric surface S4 is a surface of the second lens 116 facing to the image side. For the first lens 112 and the second lens 116, according to the present exemplary embodiment, n1 and n2 are respectively the refractive indexes. More specifically, in the present imaging lens 100, the first lens 112 satisfies 1.5<n1<1.61, and the second lens 116 satisfies 1.5<n2<1.61. In some embodiments, the first lens 112 and the second lens 116 may be disposed on the first transparent plate 114 through means such as surface mount technology (SMT) process, but the invention is not limited thereto.

In addition, the surface of the first transparent plate 114 facing the first lens 112 is surface S2, the surface of the first transparent plate 124 facing the second lens 116 is surface S3, the surface of the second transparent plate 224 facing the third lens 122 is surface S6, and the surface of the second transparent plate 224 facing the fourth lens 126 is surface S7, as illustrated in FIG. 1A.

Furthermore, the first transparent plate 114 is disposed between the first lens 112 and the second lens 116. In the present embodiment, the first lens 112 and the second lens 116 are formed on the first transparent plate 114 by methods such as wafer level lens manufacturing process, but the invention is not limited thereto. In detail, nd1 is the refractive index of the first transparent plate 114, vd1 is the abbe number of the first transparent plate 114, wherein the first transparent plate 114 satisfies the following conditions: 1.5<nd1<1.65, and 45<vd1<65. Moreover, v1 and v2 are respectively the abbe numbers of the first lens 112 and the second lens 116, and the first lens group 100 satisfies 30<v1<50, and the second lens satisfies 30<v2<50. For examples, the material of the first transparent plate 114 may be transparent polymer plastic and the material of the first lens 112 and the second lens 116 may be glass in the present embodiment, but the invention is not limited thereto. Moreover, in order to reduce the internal reflection between the first lens 112 and the first transparent plate 114 as well as the reflection between the second lens 116 and the first transparent plate 114, the first lens group 110 may further satisfies the following conditions:

|nd1−n1|<0.1, and |nd1−n2|<0.1.

Namely, the refractive indexes of the first lens 112, the first transparent plate 114, and the second lens 116 are similar. Therefore, the image brightness may be improved due to the reduction of the reflection light resulted from the different material interfaces.

Figure 1B:
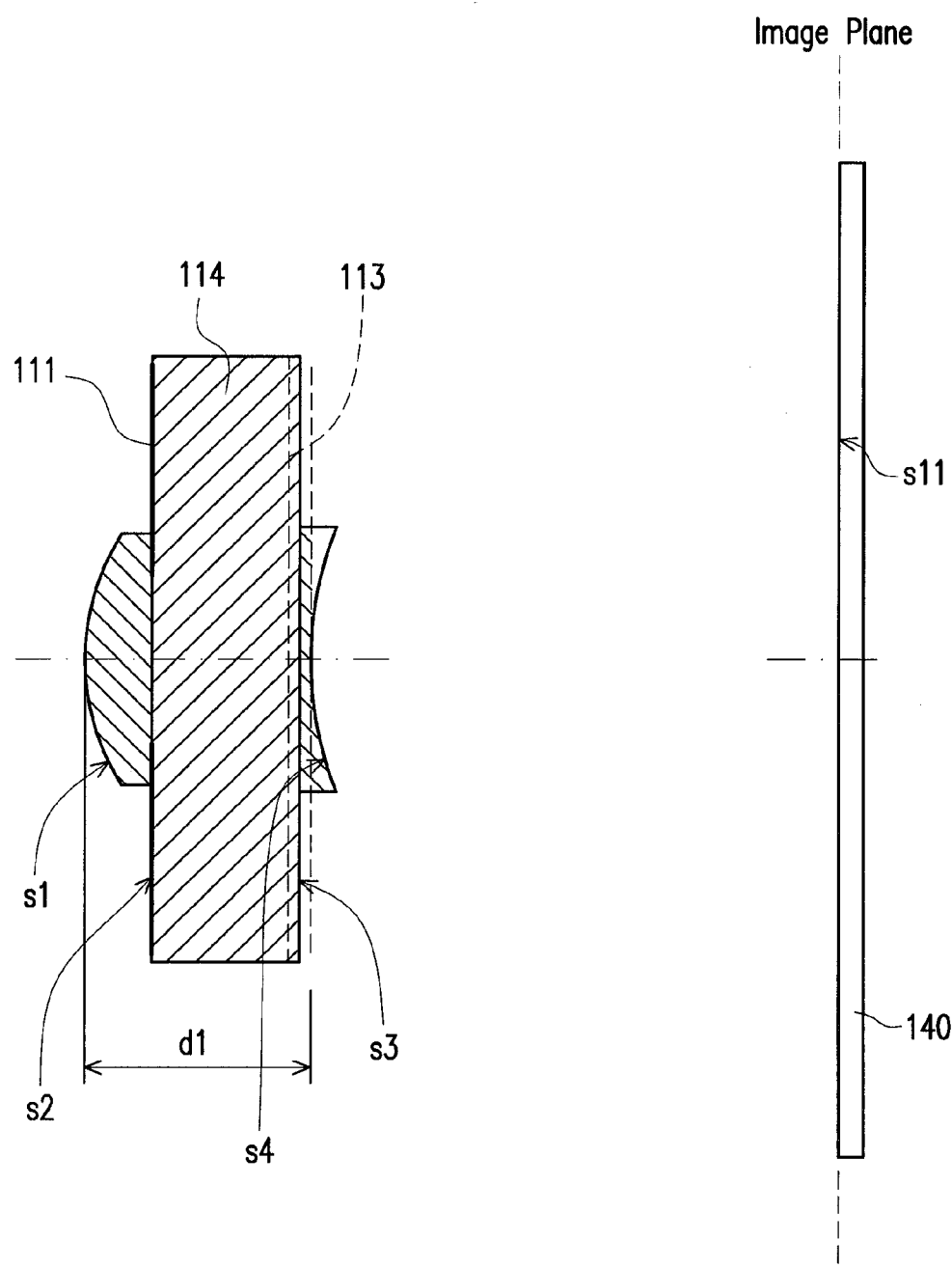
FIG. 1B is a schematic diagram of the first lens group shown in FIG. 1A.

FIG. 1B is a schematic diagram of the first lens group shown in FIG. 1A. Referring to FIG. 1B, the first lens group 110 further includes an aperture stop 111. In detail, the aperture stop 111 may disposed selectively on at least one surface of the first transparent plate 114. In the present embodiment, the aperture stop 111 is disposed on the surface S2, which is facing to the aspheric surface S1 of the first transparent plate 114, but the invention is not limited thereto. The aperture stop 111 is adopted for determining the amount of light reaching the image processing device 140. Furthermore, the aperture stop 111 can be formed on the surfaces (for example, surface S2 or surface S3) of the first transparent plate 114 in a manner such as coating or doping. Accordingly, the first lens group 110 is a complex optical element with miniaturized size, and may reduce the intensity of unwanted stray light or scattering light with the aperture stop 111.

In detail, the first lens group 110 may further includes an infrared filter 113 disposed on at least one surface of the first transparent plate 114. In this embodiment, the infrared filter 113 (e.g. IR cut) can be disposed selectively on one plane (e.g. surface S2 or surface S3) of the first transparent plate 114, but the invention is not limited thereto. The infrared filter 113 is adopted for blocking unwanted wavelength such as infrared light herein, and the infrared filter 113 can be formed on the surfaces of the first lens 112, second lens 116, or the first transparent plate 114 in a manner such as coating. Herein, the infrared filter 113 disposed on the surface S3 is an exemplary for description, the invention is not limited thereto. In another embodiment, the infrared filter 113 may be disposed on the surface S3 or the other surfaces disposed on the light transmission path. Accordingly, the first lens group 110 is a complex optical element with miniaturized size which may be manufactured and may provide good image quality, and the cost of production may thus be reduce.

Figure 1C:
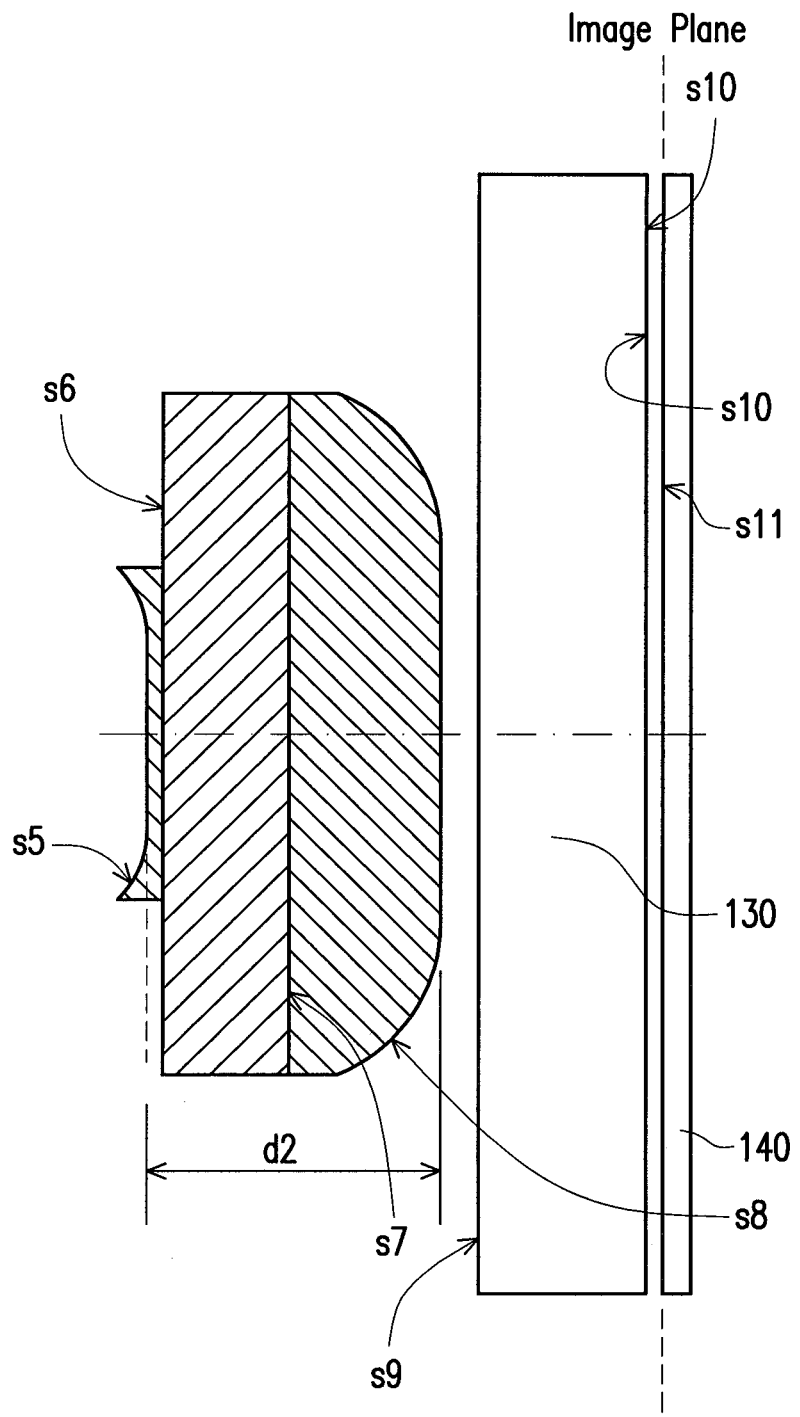
FIG. 1C is a schematic diagram of the second lens group shown in FIG. 1A.

On the other hand, FIG. 1C is a schematic diagram of the second lens group shown in FIG. 1A. Referring to FIG. 1C, the second lens group 120 includes a third lens 122 and a fourth lens 126 arranged in sequence from the object side to the image side, wherein the third lens 122 is a lens closest to the object side in the second lens group 120, the third aspheric surface S5 is a surface of the third lens 122 facing to the first lens group 110, the fourth lens 126 is a lens closest to the image side in the second lens group 120, and the fourth aspheric surface S8 is a surface of the fourth lens 126 facing to the image side. For the third lens 122 and the fourth lens 126, according to the present exemplary embodiment, n3 and n4 are respectively the refractive indexes. More specifically, in the present imaging lens 100, the third lens 122 satisfies 1.5<n3<1.61, and the fourth lens 126 satisfies 1.5<n4<1.61. In some embodiments, the third lens 122 and the fourth lens 126 may be disposed on the second transparent plate 124 as well, but the invention is not limited thereto.

Furthermore, v3 and v4 are respectively the abbe numbers of the third lens 122 and the fourth lens 126, the second lens group 120 satisfies 30<v3<50, and 30<v4<50 in the present embodiment. Besides, nd2 is the refractive index of the second transparent plate 124, and vd2 is the abbe number of the second transparent plate 124, wherein the second transparent plate 124 satisfies the following conditions: 1.5<nd2<1.65, and 45<vd2<65. In detail, the second lens group 120 further satisfies the following conditions:

|nd2−n3|<0.1, and |nd2−n4|<0.1.

As described in the statements of the first lens group 110, the similar refractive indexes n3, n4, and nd2 may reduce the reflection between the different materials and may also prevent from the internal total reflection when light propagated through the interfaces between the third lens 122, the transparent plate 124, and the fourth lens 126. Therefore, the image brightness may be improved due to the reduction of the reflection light resulted from the different material interfaces.

Besides, the imaging lens 100 further includes a protection cover 130 disposed between the fourth lens 126 and the image side. The protection cover 130 is used for protecting an image processing device 140 which is disposed on the image side. The image processing device 140 captures the image formed on the image side by the imaging lens 100. In detail, the protection cover 130 has two surfaces, wherein a surface S9 faces to the object side, and another surface S10 faces to the surface S11 of the image processing device 140 as illustrated in FIG. 1A. In the present embodiment, a material of the protection cover 130 may be a transparent material, for example, glass, or transparent resins, et cetera.

Moreover, in the present embodiment, the first transparent plate 114 and the second transparent plate 124 may be both flat plates. For examples, in the wafer level lens manufacturing processes, the first transparent plate 114 and the second transparent plate 124 may be pieces cut from a flat transparent substrate with a plurality of micro lens formed on, but the invention is not limit thereto as well.

An embodiment of the imaging lens 100 is provided below. It should be noticed that data listed in following table 1 and table 2 are not used to limit the invention, and those skilled in the art can suitably change the parameters or settings therein without departing from the scope of the invention.

TABLE 1

| Surf | Type | Radius of curvature(mm) | Thickness (mm) | material | | Conic |
|---|---|---|---|---|---|---|
| OBJ | object side | Infinity | 500 | nd | vd | 0 |
| s1 | first lens | 0.68 | 0.2 | 1.57 | 31.6 | −26 |
| s2 | first transparent plate | Infinity | 0.4 | 1.51 | 61.6 | 0 |
| s3 | second lens | Infinity | 0.04 | 1.57 | 31.6 | 0 |
| s4 | | 1.45 | 0.195 | air | | 8 |
| s5 | third lens | −15.87 | 0.03 | 1.57 | 31.6 | 0 |
| s6 | second transparent plate | Infinity | 0.35 | 1.51 | 61.6 | 0 |

TABLE 1-continued

| Surf | Type | Radius of curvature(mm) | Thickness (mm) | material | | Conic |
|---|---|---|---|---|---|---|
| s7 | fourth lens | Infinity | 0.33 | 1.57 | 31.6 | 0 |
| s8 | | 8.55 | 0.13 | air | | 0 |
| s9 | protection cover | Infinity | 0.4 | 1.51 | 61 | 0 |
| s10 | | Infinity | 0.04 | | | 0 |
| IMA | image side | Infinity | | | | 0 |

In Table 1, the distance refers to a linear distance along the optical axis A between two neighbouring surfaces. For example, the distance of surface S3 is the linear distance along the optical axis A between surface S3 and surface S4. The distance, index of refraction, and Abbe number corresponding to each of the lenses listed in the "Type" column can be found in the corresponding values for the distance, index of refraction, and Abbe number from each row.

Moreover, in Table 1, surface S1 is the surface of the first lens 112, surface S2 and surface S3 are the surfaces of the first transparent plate 114, surface S4 is the surface of the second lens 116, surfaces S5 is the surface of the third lens 122, surface S6 and surface S7 are the surfaces of the second transparent plate 124, surface S8 is the surface of the fourth lens 126, surfaces S9 and S10 are two surfaces of the protection cover 130, and the surface S11 is a surface of the image processing device 140, wherein a value filled in the distance field in the row of the surface S10 is a distance between the surface S10 and the image processing device 140, as illustrated in FIG. 1A. Besides, the plus and minus signs for the radius of curvature represents the direction of the surface. In this embodiment, a positive paraxial radius of curvature means an aspheric surface having the positive paraxial radius of curvature curves towards the object side on the optical axis of the imaging lens, and a negative paraxial radius of curvature means an aspheric surface having the negative paraxial radius of curvature curves towards the image side on the optical axis of the imaging lens.

The radius of curvature, the distance, and other parameters are shown in Table 1, so they are not further described herein. Although no limitation is provided for Abbe number within the imaging lens 100, it should be noted that Abbe number of each lens is chosen in a reasonable manner. Since Abbe numbers, which is related to the material's dispersion (chromatic aberration), are important for designing a lens module, the numbers are also given in Table 1. As shown in Table 1, the design of the imaging lens 100 fully satisfies the conditions mentioned above.

The above surfaces S1, S4, S5, and S8 are aspheric surfaces with even power, and are expressed by the following formula:

$$Z(r) = \frac{cr^2}{1+\sqrt{1-(1+k)c^2r^2}} + \alpha_1 r^2 + \alpha_2 r^4 + \alpha_3 r^6 + \alpha_4 r^8 + \alpha_5 r^{10} + \alpha_6 r^{12} + \alpha_7 r^{14} + \alpha_8 r^{16}$$

In the formula, Z(r) is a sag of the displacement of the surface from the vertex or the related perpendicular line in the direction of the optical axis A, and c is the inverse of the radius of an osculating sphere, i.e. the inverse of the radius of curvature (e.g., the radius of curvatures of surfaces S1, S4, S5, and S8 in the Table 1) close to the optical axis A. k is a conic coefficient, which is mentioned in table 1, r is a height of an aspheric surface, i.e. a height from a center to an edge of a lens, and $\alpha_1$-$\alpha_8$ are aspheric coefficients, and in the present embodiment, the coefficient $\alpha_1$ is 0. The other parameters $\alpha_2$-$\alpha_8$ of the surfaces S1, S4, S5 and S8 are listed in Table 2.

TABLE 2

SURFACE DATA DETAIL:

Surface 1: even aspheric surface

Coeff on r4: 10.042786
Coeff on r6: −167.36083
Coeff on r8: 2059.2961
Coeff on r10: −12693.89
Coeff on r12: −1052.089
Coeff on r14: 423066.5
Coeff on r16: −1511480.8

Surface 4: even aspheric surface

Coeff on r4: 0.55987102
Coeff on r6: −31.953668
Coeff on r8: 740.41209
Coeff on r10: −7695.287
Coeff on r12: 30339.487
Coeff on r14: 38258.276
Coeff on r16: −404146.89

Surface 5: even aspheric surface

Coeff on r4: −0.60220976
Coeff on r6: −27.36823
Coeff on r8: 471.19444
Coeff on r10: −4669.7897
Coeff on r12: 22587.267
Coeff on r14: −41889.151
Coeff on r16: −25045.393

Surface 8: even aspheric surface

Coeff on r4: 0.1670655
Coeff on r6: −3.3762561
Coeff on r8: 10.781595
Coeff on r10: −19.385029
Coeff on r12: 15.801591
Coeff on r14: −2.5293723
Coeff on r16: −2.6917207

Figure 1D:
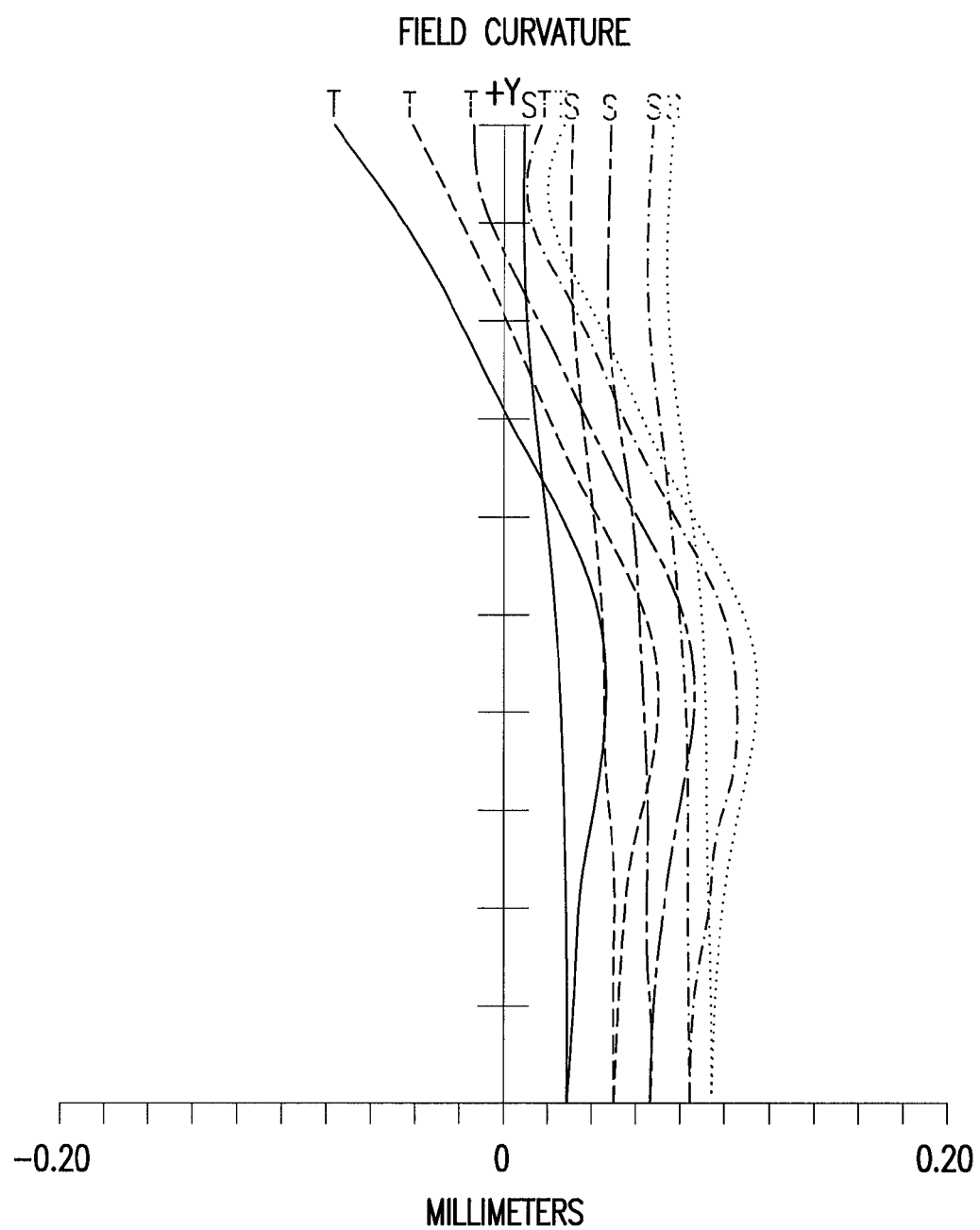
FIG. 1D and FIG. 1E are imaging optical simulation data diagrams of the imaging lens 100 of FIG. 1A.
Figure 1E:
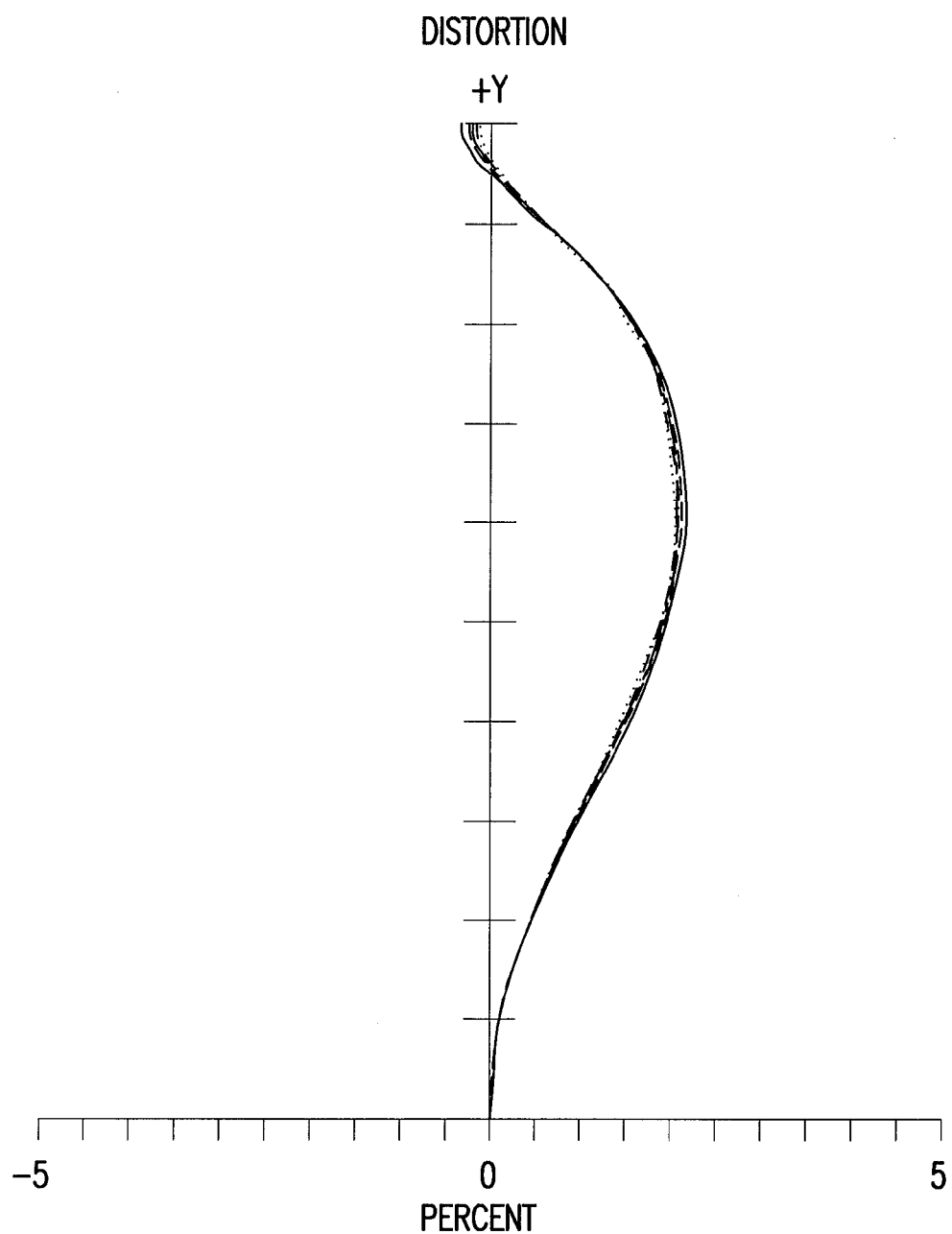

FIG. 1D and FIG. 1E are imaging optical simulation data diagrams of the imaging lens 100 of FIG. 1A. Referring to FIG. 1D and FIG. 1E, a field curvature diagram and a distortion diagram are respectively illustrated from the left to the right in FIG. 1D. Moreover, FIG. 1E is a transverse ray fan plot of images. In FIG. 1D, the field of curvatures labelled S represent the sagittal focal surfaces and the field of curvatures labelled T represent the tangential focal surfaces. According to FIG. 1D and FIG. 1E, it is known that the distortion of the imaging lens 100 of the present embodiment are similar to multi-wavelength images (e.g. 643 nm, 610 nm 550 nm, 510 nm, and 470 nm in FIG. 1E) and thus the chromatic aberration of the imaging lens 100 is unobvious. Moreover, the difference between the sagittal and the tangential field of curvature are small (about 0.02 mm) when the aperture of the imaging lens 100 is set in an appropriate diameter (e.g. ? mm in FIG. 1D), and thus the quality of the image form by the imaging lens 100 is good. Therefore, the imaging lens 100 may provide good imaging quality while maintaining a miniaturized size, and thus may be suitable to be applied in the manufacturing process such as surface mount technology (SMT) process and may improve the manufacturing efficiency.

Figure 1F:
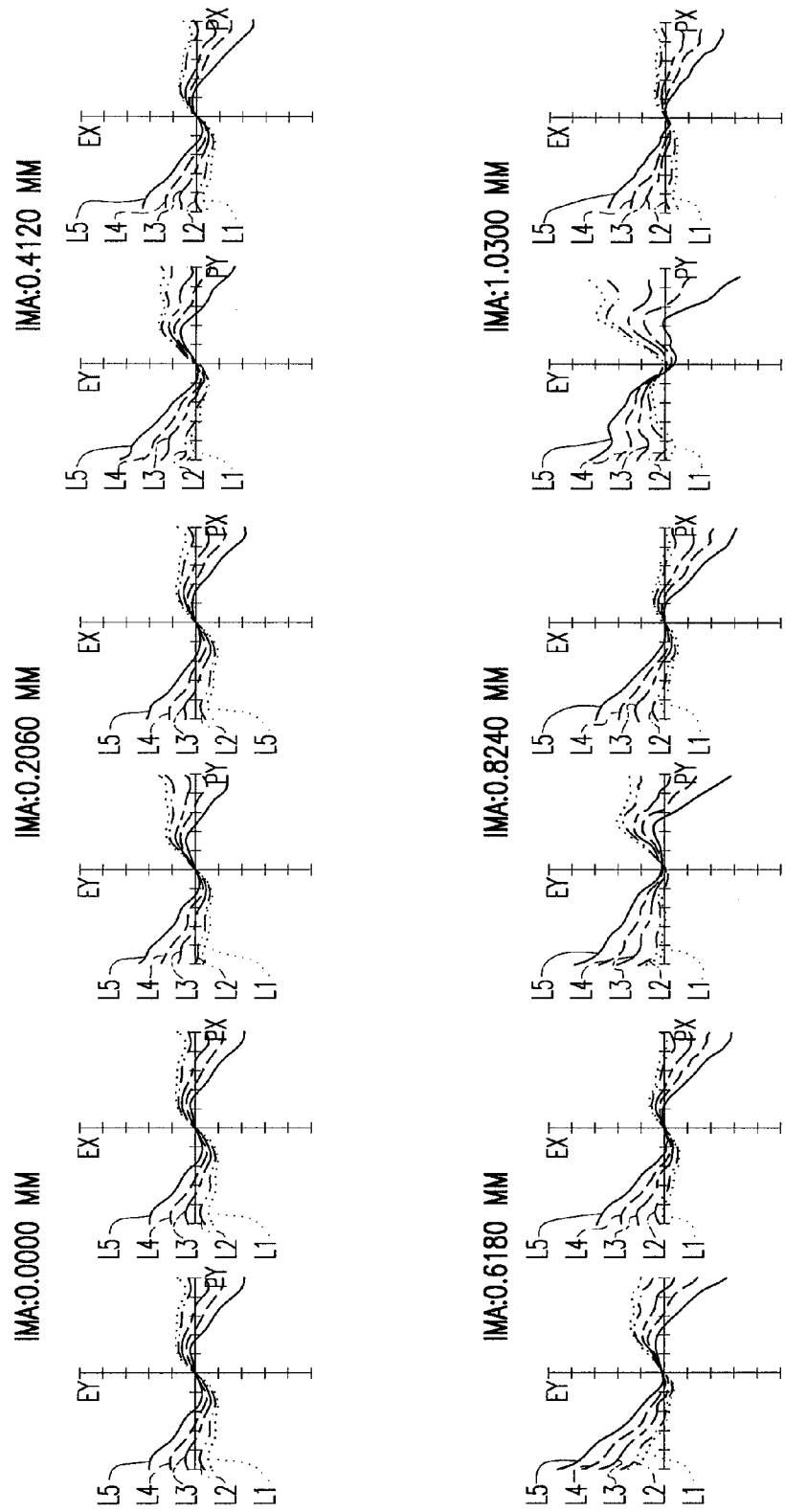
FIG. 1F is the transverse ray fan plot of the imaging lens in FIG. 1A.

FIG. 1F is the transverse ray fan plot of the imaging lens 100. Referring to FIG. 1F, the 6 transverse ray fan plot represents the aberration on or near the image surface (namely the surface S11 in the present embodiment). The numbers labelled after the IMA represent the distance (in millimetres) between the measured plane and the image plane, and the five curves L1 to L5 in each plot represent the tested five wavelength of the light (e.g. 643 nm, 610 nm, 550 nm, 510 nm, and 470 nm respectively correspond to curves L1 to L5 in the present embodiment) of the image respectively. According to FIG. 1F, it is obvious that the aberration on or near the image surface are similar and unobvious in paraxial light. Moreover, the off-axial aberration of light with larger wavelengths such as 643 nm and 610 nm (red) in the present embodiment can also be controlled with in the imaging lens 100 since the size of the imaging lens 100 may be miniaturized to an appropriate size. Therefore, the imaging lens 100 may provide good image quality as well as miniaturized size. Besides, the material of the imaging lens 100 may be designed to be heat resistant, and, together with the miniaturized size, the imaging lens 100 can be easily integrated into the assembly process with other component (e.g. the image sensor, mobile telephone or other electronic device) in such as SMT process, and may further reduce the cost in assembly process.

In summary, according to the exemplary embodiments of the invention, the first lens group includes the aperture stop and the infrared filter which are optionally disposed on the surfaces of the transparent flat lens to form a complex optical element. Besides, the imaging lens including complex optical elements with good imaging quality has been miniaturized, and the material for the imaging lens 100 may be designed to be heat-resistant for applying in such as SMT process. Therefore, the imaging lens can be applied in the manufacturing process to simplify the assembly process and may improve the manufacturing efficiency. Therefore, since the imaging lens has four aspheric surfaces and satisfies: −8<f2/f<−4, the imaging lens has good imaging quality.

It will be apparent to those skilled in the art that various modifications and variations can be made to the structure of the disclosed embodiments without departing from the scope or spirit of the invention. In view of the foregoing, it is intended that the invention cover modifications and variations of this invention provided they fall within the scope of the following claims and their equivalents.

What is claimed is:

1. An imaging lens comprising:
a first lens group disposed between an object side and an image side, wherein a surface closest to the object side in the first lens group is a first aspheric surface, a surface closest to the image side in the first lens group is a second aspheric surface, and the first lens group comprising a first transparent plate positioned between the first aspheric surface and the second aspheric surface; and
a second lens group disposed between the first lens group and the image side, wherein a surface closest to the first lens group in the second lens group is a third aspheric surface, a surface closest to the image side in the second lens group is a fourth aspheric surface, and the second lens group comprises a second transparent plate positioned between the third aspheric surface and the fourth aspheric surface,
wherein the imaging lens satisfies: −8<f2/f<−4, where f is an effective focal length (EFL) of the imaging lens, and f2 is an EFL of the second lens group.

2. The imaging lens as claimed in claim 1, wherein the imaging lens further satisfies: 0.8<d1/d2<1, where d1 is a distance between the first aspheric surface and the second aspheric surface along an optical axis of the imaging lens, and d2 is a distance between the third aspheric surface and the fourth aspheric surface along the optical axis of the imaging lens.

3. The imaging lens as claimed in claim 1, wherein the imaging lens satisfies: 0.3<r1/r2<0.6, where r1 is a paraxial radius of curvature of the first aspheric surface, and r2 is a paraxial radius of curvature of the second aspheric surface.

4. The imaging lens as claimed in claim 1, wherein the imaging lens satisfies: r1>>0, r2>0, r3<0, and T4>0, where r1 is a paraxial radius of curvature of the first aspheric surface, r2 is a paraxial radius of curvature of the second aspheric surface, r3 is a paraxial radius of curvature of the third aspheric surface, and r4 is a paraxial radius of curvature of the fourth aspheric surface, and wherein a positive paraxial radius of curvature means an aspheric surface having the positive paraxial radius of curvature curves towards the object side on the optical axis of the imaging lens, and a negative paraxial radius of curvature means an aspheric surface having the negative paraxial radius of curvature curves towards the image side on the optical axis of the imaging lens.

5. The imaging lens as claimed in claim 1, wherein the first lens group further comprises a first lens and a second lens arranged in sequence from the object side to the image side, wherein the first lens is a lens closest to the object side in the first lens group, the first aspheric surface is a surface of the first lens facing to the object side, the second lens is a lens closest to the second lens group in the first lens group, and the second aspheric surface is a surface of the second lens facing to the image side, wherein the first lens and the second lens are disposed on the two opposite sides of first transparent plate.

6. The imaging lens as claimed in claim 5, wherein the first lens group satisfies 1.5<n1<1.61 and 1.5<n2<1.61, where n1 and n2 are respectively the refractive indexes of the first lens and the second lens.

7. The imaging lens as claimed in claim 6, wherein the first lens satisfies 30<v1<50, and the second lens satisfies 30<v2<50, where v1 and v2 are respectively the abbe numbers of the first lens and the second lens.

8. The imaging lens as claimed in claim 6, wherein the first transparent plate satisfies: 1.5<nd1<1.65, and 45<vd1<65, where nd1 is the refractive index of the first transparent plate, and vd1 is the abbe number of the first transparent plate.

9. The imaging lens as claimed in claim 8, wherein the first lens group further satisfies:

$|nd1-n1|<0.1$, and $|nd1-n2|<0.1$.

10. The imaging lens as claimed in claim 1, wherein the first lens group further comprises an aperture stop.

11. The imaging lens as claimed in claim 10, wherein the aperture stop is disposed on at least one surface of the first transparent plate.

12. The imaging lens as claimed in claim 10, wherein the first lens group further comprises an infrared filter disposed on at least one surface of the first transparent plate.

13. The imaging lens as claimed in claim 1, wherein the second lens group further comprises a third lens and a fourth lens arranged in sequence from the object side to the image side, wherein the third lens is a lens closest to the object side in the second lens group, the third aspheric surface is a surface of the third lens facing to the first lens group, the fourth lens is a lens closest to the image side in the second lens group, and the fourth aspheric surface is a surface of the fourth lens facing to the image side, wherein the third lens and the fourth lens are disposed on two opposite sides of the second transparent plate.

14. The imaging lens as claimed in claim 13, wherein the second lens group satisfies 1.5<n3<1.61 and 1.5<n4<1.61, where n3 and n4 are respectively the refractive indexes of the third lens and the fourth lens.

15. The imaging lens as claimed in claim 14, wherein the second lens satisfies 30<v3<50, and the fourth lens satisfies 30<v4<50, where v3 and v4 are respectively the abbe numbers of the third lens and the fourth lens.

16. The imaging lens as claimed in claim 14, wherein the second transparent plate satisfies: 1.5<nd2<1.65, and 45<vd2<65, where nd2 is the refractive index of the second transparent plate, and vd2 is the abbe number of the second transparent plate, wherein.

17. The imaging lens as claimed in claim 15, wherein the second lens group further satisfies the following conditions:

$|nd2-n3|<0.1$, and $|nd2-n4|<0.1$.

18. The imaging lens as claimed in claim 1, wherein the first transparent plate and the second transparent plate are both flat plates.

* * * * *